J. N. BROOKE.
EVAPORATOR.
APPLICATION FILED JULY 1, 1918.

1,349,810.

Patented Aug. 17, 1920.

Inventor
John N. Brooke
by Herbert W. Jenner
Attorney

UNITED STATES PATENT OFFICE.

JOHN N. BROOKE, OF HALIFAX, ENGLAND.

EVAPORATOR.

1,349,810.

Specification of Letters Patent.   Patented Aug. 17, 1920.

Application filed July 1, 1918.   Serial No. 242,883.

*To all whom it may concern:*

Be it known that I, JOHN NEWTON BROOKE, a subject of King George V of Great Britain, residing at Lightcliffe, Halifax, in the county of York, England, have invented a new and useful Improvement in Evaporators, of which the following is a specification.

This invention relates to evaporators for waste acid liquors produced in the manufacture of picric acid or like explosive bodies. It is commonly the practice to secure concentration of such waste acid liquors by causing them to flow in a cascade over shallow dishes or vessels arranged in batteries and located over furnaces and, as a consequence, there is constant danger of firing with the result that explosions frequently occur. My invention has for its object the employment, in suitable vessels, of steam as the medium for securing concentration or evaporation of the waste acid liquors, whereby all danger of firing and of explosions taking place is avoided.

According to my invention, I employ pots or enameled or like suitable vessels which may be arranged in series to form batteries, each battery consisting of a suitable number of pots or vessels through which the acid liquor is caused to flow in succession, or each vessel may constitute an independent unit. The waste acid is fed in at the top of the vessel, or the first vessel of the series or battery, through a cover at the top thereof, and concentration or evaporation of the liquor supplied to the vessels is effected by means of steam of suitable pressure, or superheated steam, caused to circulate through a coil located within the vessel so as to present a large area of heating surface to the waste liquor in which it is submerged, or instead of circulating steam through a coil submerged in the liquor, the pot or vessel may be steam jacketed and steam caused to circulate through the steam space to cause evaporation or concentration by external heat, or steam may both be circulated through a coil submerged in the liquor and through the steam space in the jacketed vessel.

The object and nature of the invention thus set forth will appear more fully from the accompanying description and drawing and will be particularly pointed out in the claim.

Figure 1:
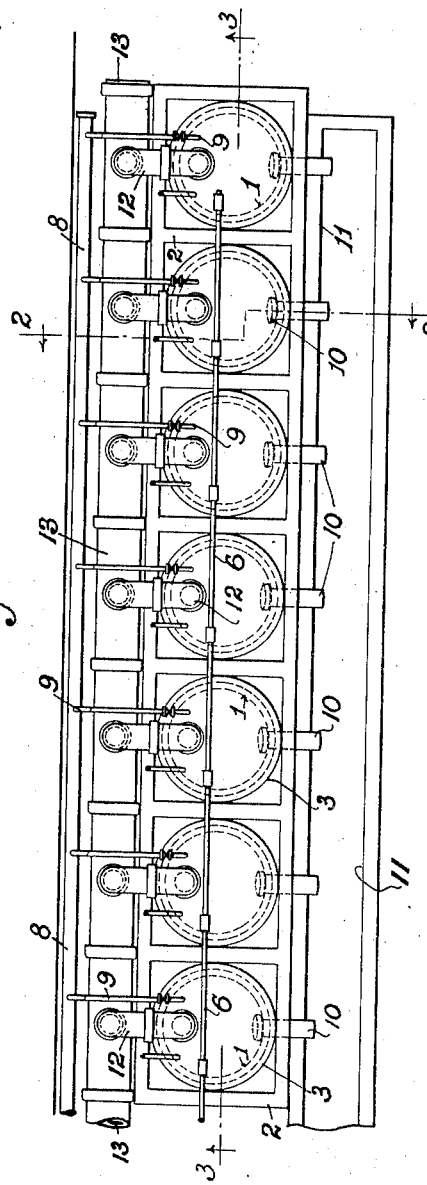
Figure 1 is a plan view of a concentration plant embodying my invention in which the waste acid is concentrated in separate vessels in the series or battery.

Referring to the drawing, my invention consists in the employment of a series of pots or enameled or like suitable vessels 1 forming a battery. Several batteries each comprising a series of pots 1 or the like may be employed.

The pots are each supported on and surrounded by brick walls 2, but it will be understood that instead of individual or separate pots I may build the vessels *in situ* of any suitable acid resisting material. Each pot or vessel 1 is sealed up at the top by a slab 3.

Figure 3:
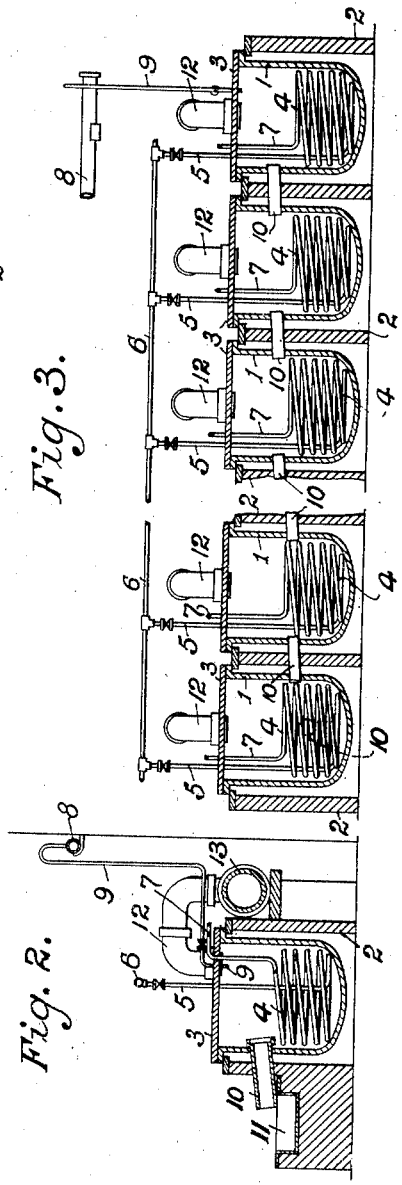
Fig. 3 is a longitudinal vertical section assumed to be taken on line 3—3 of Fig. 1, with a part broken away, of a similar plant in which the waste acid is caused to pass from one vessel to another in the series or battery.
Figure 2:
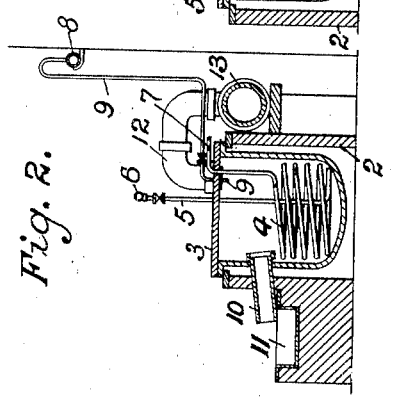
Fig. 2 is a transverse sectional elevation taken on line 2—2 of Fig. 1.

In the arrangement shown at Figs. 1 and 2 the acid is concentrated separately in each vessel, but if preferred, the acid may be caused to overflow from one vessel into the next and so on through the series as illustrated at Fig. 3, the concentrated acid being delivered from each vessel or from the last vessel of the series into a trough or storage tank. I have found that efficient concentration of the acid is obtained in each individual vessel and will first describe this construction. Referring to Figs. 1 and 2 within each of the vessels 1 is supported at the lower end thereof a steam coil 4 to which steam of suitable pressure, say 50 lbs., or superheated steam, is supplied through pipe 5 from a main supply pipe 6, the exhaust steam escaping from the vessel through a pipe 7. The said coil presents a large area of heating surface to the waste liquor in which it is submerged. Instead of circulating through a coil, or in addition to circulating through a coil, steam may also be circulated through a jacket surrounding the pot or vessel 1.

The waste liquor to be concentrated is supplied to a pipe 8 from which it passes through branch pipes 9 into each vessel 1, where it is subjected to the heat from the coil therein and is concentrated, the concentrated acid flowing out through a pipe 10 which delivers it into a trough 11 extending along the front of the series of pots 1 the said trough in turn conveying it to a receiving tank (not shown). Connected with the top of each vessel is a branch outlet pipe 12 which conveys away the fumes to a main fume pipe 13 communicating with an uptake or with any construction of fume absorption plant.

If it is preferred that the acid should be treated in each vessel of the series or battery in succession, these are arranged side by side as shown in Fig. 3, or in the same manner as shown in Fig. 1, the outlet or overflow pipes 10 in this instance each extending to the next succeeding vessel 1 to deliver the overflow thereto instead of to an outside trough, the overflow pipe in the last vessel of the series discharging into the trough 11 or direct into a receiving tank.

The pipes 10 extend laterally between the vessels or tanks, and each pipe 10 is arranged to deliver the liquor at a little lower level than the pipe 10 before it in the series. There is a constant reduction of the liquor as it passes from vessel to vessel, on account of the deposit of the crystals of picric acid in the vessels. The pipes 10 are placed at such heights as will maintain the liquor at progressively decreasing levels in the series of vessels, and enable the liquor to flow from each vessel into the next succeeding vessel.

To recover the highest percentage of acid, the liquor after the first process of concentration may undergo a second or third concentration, especially if concentrated in single vessels, and if treated in a series of vessels, it may be passed through more than one battery.

The steam coil 4 is composed of any suitable acid resisting metal such as lead.

Having thus described my invention, what I claim as new and desire to secure by Letters Patent is:—

An apparatus for concentrating weak picric acid under atmospheric pressure, comprising a series of vessels, pipes extending between the vessels, said pipes being arranged at successively decreasing levels so that the level of the liquor in each vessel is a little lower than in the vessel preceding it in the series, and means for applying steam heat to the liquor in the vessels to concentrate it and effect the formation of crystals of picric acid.

In testimony whereof I affix my signature in the presence of two witnesses.

JOHN N. BROOKE.

Witnesses:
 EDGAR VINCENT CHAMBERS,
 THOMAS H. BARRON.